(12) United States Patent
Riley et al.

(10) Patent No.: US 8,979,471 B2
(45) Date of Patent: Mar. 17, 2015

(54) BEARING CARRIER WITH MULTIPLE LUBRICATION SLOTS

(75) Inventors: Philip Richard Riley, Southwell (GB); Sarath Alayilveetil, Newark (GB); John Roger Bower, Newark (GB); Anthony George Stafford, Newark (GB)

(73) Assignee: Flowserve Management Company, Irving, TX (US)

(*) Notice: Subject to any disclaimer, the term of this patent is extended or adjusted under 35 U.S.C. 154(b) by 542 days.

(21) Appl. No.: 13/402,184

(22) Filed: Feb. 22, 2012

(65) Prior Publication Data
US 2012/0219403 A1 Aug. 30, 2012

Related U.S. Application Data

(60) Provisional application No. 61/446,731, filed on Feb. 25, 2011.

(51) Int. Cl.
| | | |
|---|---|---|
| F03B 11/06 | (2006.01) |
| F16C 23/06 | (2006.01) |
| F04D 29/046 | (2006.01) |
| F04D 29/06 | (2006.01) |
| F04D 29/62 | (2006.01) |
| F16C 33/66 | (2006.01) |
| F16C 35/077 | (2006.01) |

(52) U.S. Cl.
CPC ............ *F16C 23/06* (2013.01); *F04D 29/0462* (2013.01); *F04D 29/061* (2013.01); *F04D 29/622* (2013.01); *F16C 33/6622* (2013.01); *F16C 35/077* (2013.01); *F16C 2360/42* (2013.01); *F16C 2226/60* (2013.01)
USPC .............................................. 415/1; 415/131

(58) Field of Classification Search
USPC .............. 415/1, 112, 131; 384/462, 473, 474, 384/519, 583
See application file for complete search history.

(56) References Cited

U.S. PATENT DOCUMENTS 2,337,403 A * 12/1943 Myers et al. ................... 384/473
4,340,262 A * 7/1982 Rugh et al. .................... 384/473
(Continued)

FOREIGN PATENT DOCUMENTS

| EP | 1 640 627 A1 | 3/2006 |
| GB | 2 327 468 A | 7/1997 |
| WO | 2008/011400 A2 | 1/2008 |

OTHER PUBLICATIONS

International Search Report, PCT/US2012/026241, Filed Feb. 23, 2012, Completion Date Apr. 25, 2012.
(Continued)

*Primary Examiner* — Edward Look
*Assistant Examiner* — Aaron R Eastman
(74) *Attorney, Agent, or Firm* — Dinsmore & Shohl LLP

(57) ABSTRACT

A bearing assembly, a pump with a bearing assembly and a method of lubricating a pump bearing using a bearing assembly. The bearing assembly includes a bearing carrier and a bearing housing that are rotatably connected to one another to permit axial adjustment of the pump's impeller or other fluid-conveying apparatus, as well as variable rotational positioning of the bearing carrier relative to a pump housing. Numerous lubricant access apertures placed around the periphery of the bearing carrier facilitate lubricant passage from a connection on the bearing housing to the bearings, regardless of the rotational position of the carrier relative to the bearing housing or other pump structure.

20 Claims, 3 Drawing Sheets

(56) References Cited

U.S. PATENT DOCUMENTS

| | | | |
|---|---|---|---|
| 4,721,441 A * | 1/1988 | Miyashita et al. | 417/407 |
| 5,145,334 A | 9/1992 | Gutknecht | |
| 5,253,985 A * | 10/1993 | Ruetz | 417/407 |
| 5,711,615 A * | 1/1998 | Stitz et al. | 384/473 |
| 6,368,052 B2 * | 4/2002 | Uesugi et al. | 415/80 |
| 6,468,028 B1 | 10/2002 | Rockwood | |
| 6,655,910 B2 * | 12/2003 | Fonda-Bonardi | 415/106 |
| 2007/0177835 A1 * | 8/2007 | Verhaegen | 384/462 |
| 2008/0019629 A1 * | 1/2008 | McKeirnan | 384/493 |

OTHER PUBLICATIONS

Written Opinion of Examiner relating to Singapore Patent Application No. 201306223-7 dated Jan. 8, 2014.

* cited by examiner

BEARING CARRIER WITH MULTIPLE LUBRICATION SLOTS

This application claims the benefit of the filing date of U.S. Provisional Application No. 61/446,731, filed Feb. 25, 2011.

BACKGROUND OF THE INVENTION

The present invention relates generally to pumps, and more particularly to a bearing carrier for such pumps that use multiple lubrication access locations for bearings located within the pump.

Chemical process pumps are often used to move petroleum products, industrial chemicals, solvents and related fluids. Such pumps are especially well-suited for use with low-viscosity and relatively non-abrasive fluids. In one particular form, chemical process pumps employ rotating vanes that are placed relative to complementary stator or related housing surfaces to ensure tight tolerances and precise degrees of adjustment. One form of such pump, which is manufactured by the assignee of the present invention, is a centrifugal pump with a rotating impeller; such pump is referred to commercially as the Flowserve Durco® Mark 3™ ISO Pump.

For optimum capability for handing chemical products, the impellers of such pumps are of a semi front-open type, or a reverse vane type. To ensure continued proper operation over time, the pump impeller may need to be periodically adjusted. In such case (as with the pump model discussed above), the pump may include a device to permit fine-tuned adjustment of the impeller. Such a device involves rotating a bearing carrier that is disposed within a bearing housing; such a process is referred to by the Assignee of the present invention as "micrometer adjustment". While this ability to quickly and precisely adjust impeller clearances significantly contributes to overall pump operability and efficiency, it increases the complexity of the mechanism used to contain the pump's thrust bearings. This is especially true in situations involving bearing lubrication, where the connection for grease lubrication or oil mist is traditionally situated in the end face of the bearing carrier to give a simple direct passage into the chamber behind the bearing. This connection position has two disadvantages. Firstly (in situations where the connection is configured to receive grease), the connection is inside a coupling guard which therefore has to be removed every time re-greasing is required. Secondly (in situations where the lubrication system is oil mist), because the bearing carrier is rotatable, then the piping carrying the oil mist to the connection on the bearing carrier has to be remade each time the micrometer adjustment is used. In either form, this undesirably increases maintenance time and complexity.

SUMMARY OF THE INVENTION

According to one aspect of the present invention, a bearing carrier for a chemical pump has multiple apertures, slots, ports or related access holes that define passages to allow grease or oil mist entry to the bearing (including the region behind the bearing), irrespective of the bearing carrier orientation. More particularly, the connections for grease, oil mist and related lubricants are situated in the body of the bearing housing, allowing them to be in a fixed position relative thereto. In this way the multiple apertures mean that an adjacent aperture is available regardless of the angular position of the bearing carrier. The multiple apertures or holes in the bearing carrier also ensure that there is no buildup of oil on the outside of the bearing that could otherwise leak along the rotating shaft. Such oil is drained back into an oil reservoir through the adjacent hole or holes.

According to another aspect of the present invention, a pump is disclosed that includes a fluid inlet, a fluid outlet and a rotatable shaft-mounted impeller to deliver a fluid between the inlet and outlet. The pump also includes structural members to promote the rotational movement of the shaft and impeller. These structural members include a bearing assembly that is made up of at least a bearing housing and a bearing carrier that are rotatably moveable relative to one another. The bearing housing includes a connection formed through its outer surface such that a fluid link may be formed between a remote lubricant supply and one or more bearings being supported in the bearing housing. Upon coupling of the bearing carrier to the bearing housing, the relative placement of the two is such that lubricant may flow into numerous apertures formed in the channel such that passages defined by the apertures allow delivery of the lubricant to bearings mounted or otherwise supported by the assembly. Importantly, the fluid communication formed by the connection, channel, apertures and passages ensures that lubricant is delivered to the bearing regardless of a relative rotational alignment between the housing and the carrier. In this way, periodic adjustments made to (for example) the pump's impeller to control a gap or related spacing between it and a portion of the flowpath into which the impeller is disposed will not necessitate disassembly or other maintenance-intensive actions to ensure continued lubricant delivery to the bearings contained within the assembly. In one particular form, the connection in the housing is placed adjacent the channel in the carrier so that direct fluid coupling is established between them. In such a direct coupling configuration, there is no intervening structure to interfere with the relatively free flow of lubricant from the connection to the apertures that form or otherwise feed the passages.

According to yet another aspect of the present invention, a method of lubricating a pump bearing compartment is disclosed. The method includes introducing a lubricant to one or more bearings in the bearing compartment, the introducing taking place through a bearing assembly that includes a bearing housing configured to support the bearing, and bearing carrier that is rotatably engageable with the bearing housing. A connection formed in the housing cooperates with a channel formed in the bearing carrier such that numerous lubricant passages formed in the channel receive the lubricant from the connection through the channel regardless of a relative rotational alignment between the bearing housing and the bearing carrier. This is important in that periodic adjustments to pump impeller spacings—as well as uncertain rotational positions between the housing and carrier in the assembly—do not contribute to either (a) a reduction in lubricant delivery due to lubricant flowpath misalingment or (b) increased maintenance time needed to ensure proper alignment of the carrier and housing.

BRIEF DESCRIPTION OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1:
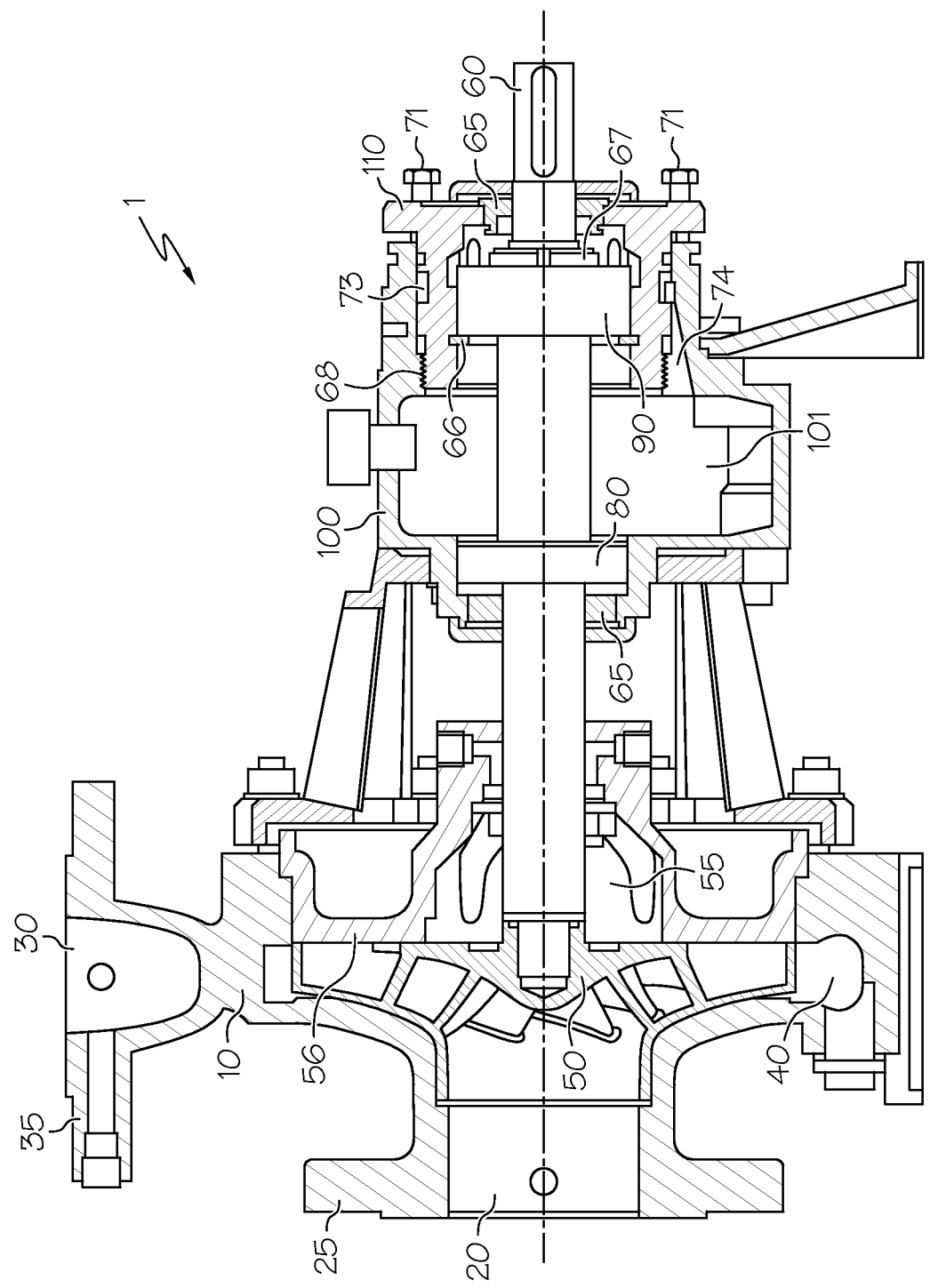
FIG. 1 is a cutaway view of a pump highlighting the location of various components therein, including the bearing carrier.

Referring first to FIG. 1, a cutaway view of a centrifugal pump 1 according to the present invention is shown. Pump 1 includes a pump housing (or casing) 10, inlet 20 and outlet 30 along with a fluid flowpath (or pumping chamber) 40 defined between them. In the present context, while pump housing 10 may be associated predominantly with the casing formed around the inlet 20, outlet 30 and flowpath 40, as well as defining integral or connectable footers and other structural hardware, it will be understood that additional covers, casing or related containment structure may also be included. Inlet flange 25 and outlet flange 35 form mounting locations to fluidly connect the respective inlet 20 and outlet 30 of pump housing 10 to corresponding conduit (not shown), and may include apertures formed therein to receive screws, bolts or related fasteners that can be used to facilitate such connection. An impeller 50 is mounted to an axle or shaft 60 that is rotated by the operation of a separate motor (not shown). In a preferred form, the shaft 60 may be made from a stiff, corrosion-resistant material, such as 316 stainless steel or the like. As is well-understood by those skilled in centrifugal pump art, fluid is received from a separate conduit through input 20 and operated upon by rotating impeller 50 so that it exits the outlet 30 with an increased pressure, velocity or related indicia of energy. A seal chamber 55 is integrally-formed in a cover 56 which is disposed within pump housing 10 behind impeller 50. Due to the small nature of the clearances between impeller 50 and casing 10 and impeller 50 and cover 56, they don't show up in the present drawing. In particular, the clearance of the reverse vane impeller 50 with cover 56 is only about 0.3 mm; with such a clearance, the impeller 50 front face runs about 2 mm axially from the casing 10. A sealing device (not shown) in chamber 55 prevents leakage of pumped fluid to atmosphere. The reliability of the seal is dependent on the pressure in the seal chamber 55, which in turn is affected by the clearance between the reverse open impeller 50 and the cover 56; this clearance may be set and adjusted by the micrometer adjustment mentioned above. Seals 65 are placed at various axial locations along shaft 60 in order to provide fluid isolation; such seals may be of any suitable static or dynamic configuration (depending on the use), including brush seals, lip seals, labyrinth seals, packing or the like. The potential for high rotational speeds of shaft 60 and impeller 50 means that structural members within pump housing 10 may be exposed to significant loads, often over the relatively long service life of pump 1. Axially-mounted bearings, such as journal bearings 80, provide radial load-transferring from the rotating impeller 50 and shaft 60 to structure within pump housing 10 and bearing housing 100, while thrust bearings 90 provide axial and radial load-transferring. Together, bearings 80 and 90 constitute a group of bearing members.

Figure 2:
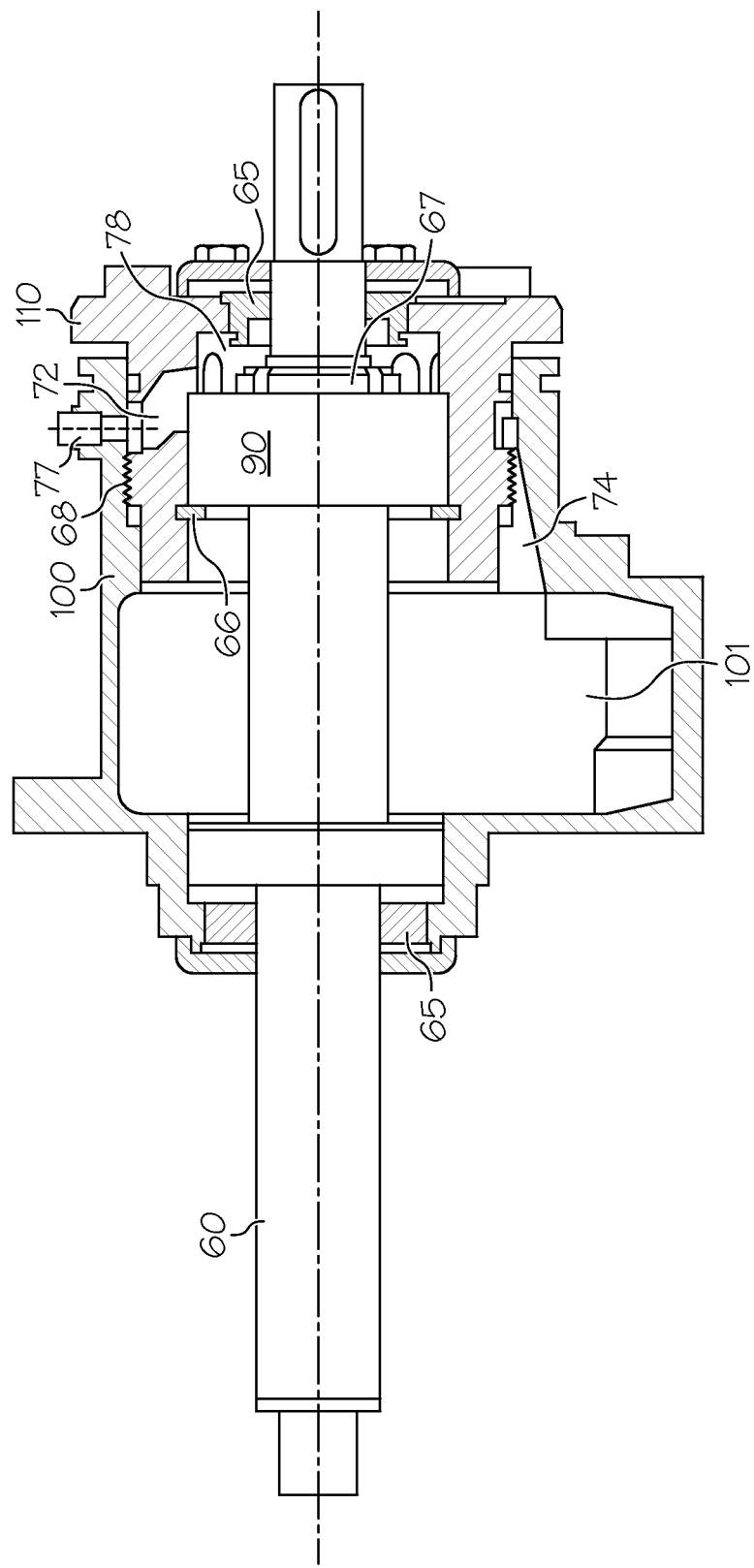
FIG. 2 is a section of an assembled bearing housing that makes up a portion of the pump of FIG. 1, the housing showing the location of a lubricant connection and an oil drain passage.

Referring next to FIG. 2 in conjunction with FIG. 1, a bearing carrier 110 is situated within bearing housing 100 at a distal end thereof such that is axially-spaced from impeller 50 within pump housing 10. The bearing carrier 110 includes the ability to vary axial clearances of impeller 50 relative to cover 56 through an externally adjusted mechanism (such as the aforementioned micrometer adjustment). The thrust bearing 90, which may be any type of anti-friction bearing capable of taking both an axial and radial load, is retained against axial movement in the bearing carrier 110. Thrust bearing 90, which in one preferred embodiment is a double row bearing, is retained by a circlip 66. Other locking mechanisms, such as nut 67, are used to help keep thrust bearing 90 locked to the shaft 60. The shaft 60, bearing carrier 110, bearings 80, 90 and impeller 50 become an axially fixed assembly. The bearing carrier 110 connects to the bearing housing 100 through threads 68 on their respective surfaces to produce a threaded and rotatable connection therebetween, where the axial position of bearing carrier 110 is determined by how far the threads 68 have been engaged. Thus, by rotating the bearing carrier 110, the axial clearance between the impeller 50 and the cover 56 may be adjusted. Once the desired position is reached, one or more screws 71 (shown with particularity in FIG. 1) are screwed and tightened through complementary holes 69 formed in the end face of the bearing carrier 110. For periodic adjustment, the screws 71 are slackened and the bearing carrier 110 is rotated by hand or by tool on one or more bosses (that project rearwardly from the bearing carrier 110) until a new desired position of the impeller 50 is achieved, after which the screws 71 are re-tightened to lock the angular position between the bearing carrier 110 and the bearing housing 100 in place. This action improves pump head and efficiency and restores the pressure in seal chamber 55 to that preferred for seal reliability. Other features useful for relating the adjusting clearances to the angular rotation of the bearing carrier 110 may also be used; for example, a scale (not shown) may be included on the end of the bearing carrier 110 as a way to help set clearances without the need for measuring devices. In a pump which has a previously mentioned semi front-open type of impeller (not shown), instead of reverse vane type of impeller 50, the impeller is set to have a controlled axial clearance with casing 10 instead of cover 56. The same mechanism is used to make the axial adjustment.

Figure 3:
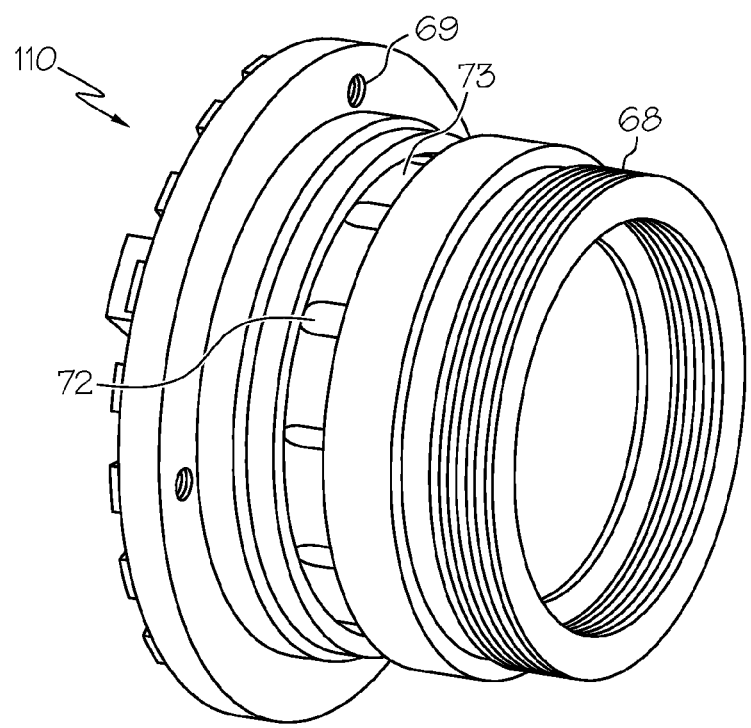
FIG. 3 is a perspective view of the bearing carrier disassembled from the bearing housing of FIG. 2.
Figure 4:
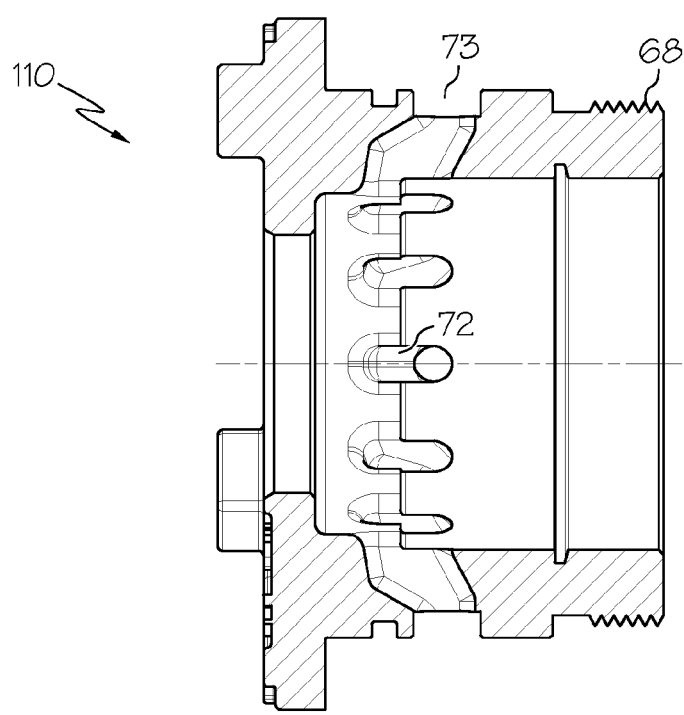
FIG. 4 is a side cutaway view of the bearing carrier of FIG. 3.

As stated above in conjunction with the prior art, a connection for feeding lubricant to the bearings is traditionally located on the rear portion of the bearing carrier. Referring next to FIGS. 2 through 4, the grease or oil mist connection 77 of the present invention is relocated onto a circumferential outer surface of the bearing housing 100 such that it is in an accessible and fixed position. This continued accessibility (irrespective of the relative angular position of the bearing carrier 110 to the bearing housing 100) is made possible by the bearing carrier 110 having multiple apertures that define passages 72 which convey the lubricant from the connection 77 in the bearing housing 100 to the chamber 78 behind the bearing 90. A circumferential channel (or groove) 73 is formed in the bearing housing 110 and permits fluid communication among all of the apertures 72 so that the lubricant being introduced through connection 77 can pass through to the bearing 90 even if the lubricant inlet connection 77 and one of the apertures 72 do not exactly line up.

If the lubrication is by oil bath, the apertures 72 and circumferential channel 73 connect the chamber 78 at the back of the bearing 90 through grooves 74 to an oil sump 101 in the bearing housing 100. Such a configuration allows any excess oil behind the bearing 90 to drain back into the sump 101. In this way, any excess lubricant buildup against bearing 90 has a substantially unimpeded flowpath to the sump 101, and as with the delivery of the lubricant to the bearing 90 through the connection 77, channel 73 and apertures 72, may take place irrespective of the rotational orientation between the bearing carrier 110 and the bearing housing 100. Significantly, this avoids having lubricant connections (in a manner generally similar to those of connections 77) be formed in the bearing carrier 110, as well as the concomitant need for removing the coupling guard to get access to such connections for re-greasing or related operations. Grooves 74 in the bearing housing 100 fluidly connects to the circumferential channel 73 to make a continuous passage, thereby allowing oil to have access to the rear row of balls (or rollers in some designs) in a double row or pair of bearings that make up bearing 90, to ensure lubrication.

Referring with particularity to FIGS. 3 and 4, while the number of lubricant apertures 72 may be varied, (potentially up to a hundred or more) one preferred embodiment includes between twelve and twenty spaced in substantially equal increments about the periphery of the circumferential channel 73 Likewise, threaded holes 69 may be formed in the outer flange of bearing carrier 110 to serve as a way to securely couple it to the bearing housing 100 through the use of complementary screws 71 or the like.

While the remainder of the present disclosure focuses on centrifugal (also known as kinetic or dynamic) variants of pump 1, it will be appreciated by those skilled in the bearing design art that the bearing carrier 110 of the present invention may be applicable to other pump configurations (such as positive displacement pumps) that may require axial adjustment of the fluid-pumping components.

While certain representative embodiments and details have been shown for purposes of illustrating the invention, it will be apparent to those skilled in the art that various changes may be made without departing from the scope of the invention, which is defined in the appended claims.

What is claimed is:

1. A bearing assembly for a pump, said bearing assembly comprising:
    a bearing housing configured to support at least one bearing therein, said bearing housing comprising a connection that is configured to form fluid communication between a lubricant supply and said at least one bearing; and
    a bearing carrier disposed between said at least one bearing and said bearing housing and rotatably engageable therewith such that selective small-scale rotational adjustment may be made between said bearing carrier and said bearing housing during periods of pump inoperability, while during periods of normal pump operation, said bearing carrier and said bearing housing are in a substantially fixed rotational relationship relative to one another, said bearing carrier defining a channel with a plurality of lubricant passages formed therein such that a lubricant delivered through said connection is placed in fluid communication with said at least one bearing through said channel and at least one of said plurality of lubricant passages irrespective of a relative rotational alignment between said bearing housing and said bearing carrier.

2. The bearing assembly of claim 1, wherein said connection is formed through a substantially radial outward surface of said bearing housing.

3. The bearing assembly of claim 1, wherein said channel defines a substantially circumferential profile about said bearing carrier.

4. The bearing assembly of claim 3, wherein said plurality of lubricant passages are spaced about said circumferential profile defined by said channel.

5. The bearing assembly of claim 4, wherein said plurality of lubricant passages are substantially evenly-spaced about said circumference.

6. The bearing assembly of claim 1, wherein said rotatably engageable disposal between said bearing carrier and said bearing housing is through a threaded fitting therebetween.

7. The bearing assembly of claim 1, wherein said bearing carrier further comprises an adjustment device that permits variable axial spacing of an impeller that defines a fluid-moving portion of said pump.

8. A pump comprising:
    a pump housing defining a fluid inlet and a fluid outlet therein;
    a pumping mechanism fluidly coupled to said inlet and said outlet and configured to deliver fluid therebetween;
    a plurality of bearing members configured to transfer loads from said pumping mechanism to said pump housing; and
    a bearing assembly for a pump, said bearing assembly comprising:
        a bearing housing configured to support at least one of said plurality of bearings therein, said bearing housing comprising a connection that is configured to form fluid communication between a lubricant supply and said at least one bearing; and
        a bearing carrier disposed between said at least one bearing and said bearing housing and rotatably engageable therewith such that selective small-scale rotational adjustment may be made between said bearing carrier and said bearing housing during periods of pump inoperability, while during periods of normal pump operation, said bearing carrier and said bearing housing are in a substantially fixed rotational relationship relative to one another, said bearing carrier defining a channel with a plurality of lubricant passages formed therein such that a lubricant delivered from said lubricant supply through said connection is placed in fluid communication with said at least one bearing through said channel and at least one of said plurality of lubricant passages irrespective of a relative rotational alignment between said bearing housing and said bearing carrier.

9. The pump of claim 8, wherein said pump is a chemical process pump.

10. The pump of claim 8, wherein said connection is formed through generally radial outward surfaces of said bearing housing, and further wherein said channel defines a substantially circumferential profile about said bearing carrier such that upon assembly of said bearing carrier and said bearing housing, said connection is in direct fluid coupling with said channel, and further wherein said plurality of lubricant passages are spaced about said circumferential profile defined by said channel.

11. The pump of claim 10, wherein said plurality of lubricant passages are substantially evenly-spaced about said circumferential profile.

12. The pump of claim 8, further comprising an adjustment device that permits variable axial spacing of said impeller relative to said pump housing.

13. The pump of claim 8, further comprising a sump placed in fluid communication with said at least one bearing such that excess amounts of said lubricant may be conveyed away from said at least one bearing.

14. A method of lubricating a pump bearing, said method comprising introducing a lubricant to said bearing through a bearing assembly, said bearing assembly comprising:

a bearing housing configured to support said bearing therein, said bearing housing comprising a connection that is configured to form fluid communication between a lubricant supply and said bearing; and a bearing carrier disposed between said bearing and said bearing housing and rotatably engageable therewith such that selective small-scale rotational adjustment may be made between said bearing carrier and said bearing housing during periods of pump inoperability, while during periods of normal pump operation, said bearing carrier and said bearing housing are in a substantially fixed rotational relationship relative to one another, said bearing carrier defining a channel with a plurality of lubricant passages formed therein such that upon receipt of said lubricant from said lubricant supply through said connection, said lubricant is delivered to said bearing through said channel and at least one of said plurality of lubricant passages irrespective of a relative rotational alignment between said bearing housing and said bearing carrier.

15. The method of claim 14, wherein said pump is a centrifugal pump.

16. The method of claim 15, wherein said pump is a chemical process pump.

17. The method of claim 14, wherein said introducing a lubricant takes place after said bearing carrier has been rotated relative to said pump such that bearing access to said lubricant after said rotation is substantially uninhibited relative to bearing access to said lubricant prior to said rotation.

18. The method of claim 17, wherein no realignment of said bearing carrier relative to said bearing housing is performed in order to retain said substantially uninhibited access of said lubricant to said bearing through said connection, said channel and said plurality of lubricant passages.

19. The method of claim 14, further comprising adjusting a spacing between a pump impeller and a pump housing such that bearing access to said lubricant after said adjustment is substantially unchanged relative to bearing access to said lubricant prior to said adjustment, said adjustment taking place without need for disassembling said bearing assembly.

20. The method of claim 14, further comprising draining any excess buildup of said lubricant that occurs adjacent said bearing to an oil sump, said draining taking place irrespective of a rotational orientation of said bearing carrier to said bearing housing.

* * * * *